US007892160B2

(12) United States Patent
Kittleson et al.

(10) Patent No.: US 7,892,160 B2

(45) Date of Patent: Feb. 22, 2011

(54) DOUBLE SLEEVED ELECTROPHOTOGRAPHIC MEMBER

(75) Inventors: Andrew P. Kittleson, Rochester, NY (US); Thomas N. Tombs, Rochester, NY (US); Craig M. Cody, Scottsville, NY (US); Mark C. Zaretsky, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1197 days.

(21) Appl. No.: 11/503,778

(22) Filed: Aug. 14, 2006

(65) Prior Publication Data

US 2008/0051275 A1 Feb. 28, 2008

(51) Int. Cl.
*F16C 13/00* (2006.01)
*B21K 1/02* (2006.01)

(52) U.S. Cl. .................... 492/49; 29/895.23; 29/895.21; 29/895.212; 29/895.2; 492/56; 492/53

(58) Field of Classification Search .............. 29/895.23, 29/895.2, 895.21, 895.212; 492/49, 53, 56
See application file for complete search history.

(56) References Cited

U.S. PATENT DOCUMENTS 1,074,590 A * 9/1913 Kempshall ............... 29/895.21
3,146,709 A * 9/1964 Bass et al. .................. 101/375
5,216,954 A * 6/1993 Thompson .................. 101/375
5,752,444 A * 5/1998 Lorig ......................... 101/375
5,904,095 A * 5/1999 Nelson ....................... 101/375
6,377,772 B1 4/2002 Chowdry et al.
6,393,226 B1 5/2002 Charlebois et al.
6,393,249 B1 * 5/2002 Aslam et al. ................ 399/333
6,394,943 B1 5/2002 Cormier et al.
6,567,641 B1 * 5/2003 Aslam et al. ................ 399/330
6,605,399 B2 * 8/2003 Chowdry et al. .............. 430/62
6,669,613 B1 * 12/2003 Van Denend ................. 492/49
7,171,147 B2 * 1/2007 Cormier et al. ............. 399/308
7,290,488 B2 * 11/2007 Petersen et al. ............. 101/479
7,322,917 B2 * 1/2008 Betti et al. ..................... 492/30
7,334,336 B2 * 2/2008 Tan et al. ................... 29/895.3
7,395,759 B2 * 7/2008 Hoffman et al. ............ 101/376
2005/0138809 A1 6/2005 Tan et al.
2005/0143240 A1 6/2005 Tan et al.

* cited by examiner

*Primary Examiner*—Essama Omgba
(74) *Attorney, Agent, or Firm*—Carl F. Ruoff; Andrew J. Anderson

(57) ABSTRACT

The present invention provides a double-sleeved roller for use in an electrostatographic machine. The double-sleeved member includes a cylindrical rigid core member. A removable inner sleeve member (ISM) is provided that includes a compliant layer that surrounds and intimately contacts the rigid core member. A removable electrically conductive outer sleeve member (OSM) such that the OSM surrounds and intimately contacts said ISM wherein the ISM and OSM are removable or mountable simultaneously.

28 Claims, 8 Drawing Sheets

DOUBLE SLEEVED ELECTROPHOTOGRAPHIC MEMBER

CROSS-REFERENCE TO RELATED APPLICATIONS

This application relates to commonly assigned Publication Numbers 2008/0035265, 2008/0038566, and 2008/0038025, filed Aug. 14, 2006 and herby incorporated by reference for all that they disclose.

FIELD OF THE INVENTION

The present invention relates to field of printing and copying. More particularly, it relates to improvements in the structure of printing or image-transfer drums of the type having a resilient outer sleeve that are supported by an underlying mandrel. Such drums are used, for example, in electrostatic document printers and copiers for temporarily receiving a toner image from an image-recording element before it is re-transferred to an image-receiver sheet or the like.

BACKGROUND OF THE INVENTION

As described by Cormier et al, in U.S. Pat. No. 6,394,943, in printing machines, copiers and the like, images are often formed on or transferred to a drum having a flexible or resilient outer sleeve that, from time to time, requires replacement. Typically, the sleeve is operatively supported by a metal cylinder or mandrel. In loading the sleeve onto the mandrel, it is common to inject air under the sleeve, thereby slightly expanding the sleeve diameter, while sliding the sleeve axially onto the mandrel's supporting surface. Usually, the nominal diameter of the resilient sleeve is slightly less than the mandrel diameter. Thus, upon discontinuing the airflow, the sleeve contracts onto the mandrel and forms a tight, interference fit.

There are significant costs associated with compliant sleeve design. In order to meet registration requirements high precision grinding operations are necessary to establish low run-out and surface roughness properties. The support for the sleeve member is typically a seamless metal, which adds significant cost to manufacture the sleeve. Additionally, in order to meet transfer and registration requirements, the sleeve must have a uniform diameter within narrow tolerances in order to minimize variations in overdrive and nip width. The grinding operation typically used to obtain the correct diameter is a manufacturing step adding significant cost to manufacture the sleeve. Additionally, the surface of the sleeve wears out prior to the loss of integrity to the sleeve as a whole so that more material waste than necessary is produced.

Charlebois et al, U.S. Pat. No. 6,393,226, describe a means of controlling variations of overdrive in the resilient sleeve by embedding a stiffening layer below the imaging surface in order to achieve very high quality color rendition in a color reproduction apparatus, including excellent registration in all areas of a print. Locating the stiffening layer below the imaging surface requires additional manufacturing steps, adding significant cost to manufacture the sleeve. Adding the stiffening layer to the basic sleeve design introduces additional disadvantages. Two critical grinding surfaces are present in the described design, both of which are necessary to maintain satisfactory image quality. For the inner compliant blanket portion of the roller a grinding operation is required to establish proper mating between the inner compliant blanket and the stiffening layer and minimize run-out build up to the outside compliant blanket surface. Additionally, the outer compliant blanket portion of the roller must be ground for surface roughness and run-out requirements. The preferred stiffening layer solutions utilize expensive metal seamless sleeves to meet diameter, run out, and conicity requirements for properly mating the inner and outer compliant portions of the blanket. Metal stiffening layers also contribute to higher installation forces, higher reaction forces in fixed engagement nips, and tight tolerances.

Chowdry et al, U.S. Pat. No. 6,377,772, describe an improved solution to the multi-layer roller by describing a double-sleeved roller including a rigid cylindrical core member, a replaceable removable compliant inner sleeve member in non-adhesive contact with and surrounding the core member, and a replaceable removable outer sleeve member in non-adhesive contact with and surrounding the inner sleeve member. Although the invention enables the independent replacement of the inner and outer sleeves to reduce the costs of the components, the means envisioned for installing the members increases the complexity and cost of the mandrel support apparatus and limits the range of materials that can be used to obtain a working double-sleeved roller.

Tan et al, US2005/0138809 A1 and US2005/0143240 A1, describe a sleeve member without a metal core, resulting in a reduced cost of the part. The compliant sleeve member is mounted directly on a mandrel to form an image cylinder or a blanket cylinder for use in an electrophotographic process. The sleeve still requires a uniform diameter within narrow tolerances, thus the associated cost of grinding the surface still adds significant cost to the manufacture of the sleeve. Additionally, with the unsupported sleeve solution it can be difficult to balance the need for ease of installation with the need for properly mated sleeves and cores to avoid slipping during operation.

A need exists for a novel replaceable removable double-sleeved roller (DSR) that does not require costly mandrel hardware or costly manufacturing steps while enabling the benefits of a stiffening layer in a compliant imaging roller.

In view of the forgoing discussion, an object of the present invention is to provide a simplified mounting method for double-sleeved roller members (DSM) that may be employed in an electrostatographic apparatus and methods thereof. The present invention improves on the double-sleeved roller design by enabling a method of mounting and removal of both components of a DSR configuration simultaneously.

Another object of the present invention is to reduce the cost of a DSM. The novel mounting method of this invention enables configurations of the roller design that reduce part cost by relaxing tolerances and broaden suitable material choices for the stiffening layer. An improved double-sleeved roller mounting method enables a compliant inner sleeve member (ISM) and a compliant outer sleeve member (OSM) with improved structure that lowers manufacturing costs.

Another object of the present invention is to reduce the cost of the electrostatographic apparatus for a DSR. The novel mounting method of this invention enables mounting apparatus hardware that is significantly less complex and expensive than previous disclosures envisioned. The simultaneous mounting of the ISM and OSM allow the hardware of the mandrel to be as simple as a single sleeve roller installation.

Another object of the present invention is directed at improved registration performance. The invention enables performance-improving characteristics of a stiffening layer in a compliant roller because the support layer of the outer sleeve acts as a stiffening layer when the DSM is mounted on mandrel.

SUMMARY OF THE INVENTION

The present invention provides a double-sleeved roller for use in an electrostatographic machine. The double-sleeved member includes a cylindrical rigid core member. A removable inner sleeve member (ISM) is provided that includes a compliant layer that surrounds and intimately contacts the rigid core member. A removable electrically conductive outer sleeve member (OSM) such that the OSM surrounds and intimately contacts said ISM wherein the ISM and OSM are removable or mountable simultaneously.

BRIEF DESCRIPTION OF THE DRAWINGS

FIG. 3(*b*) is a cross-sectional view, not to scale, of a DSITM roller according to an embodiment of the invention.

FIG. 4(*b*) is a cross-sectional view, not to scale, of a (DSPIFM) according to an embodiment of the invention.

FIG. 5(*b*) is a schematic perspective view, not to scale, of a DSITM outer sleeve support (OSSL) according to an embodiment of the invention.

Figure 1:
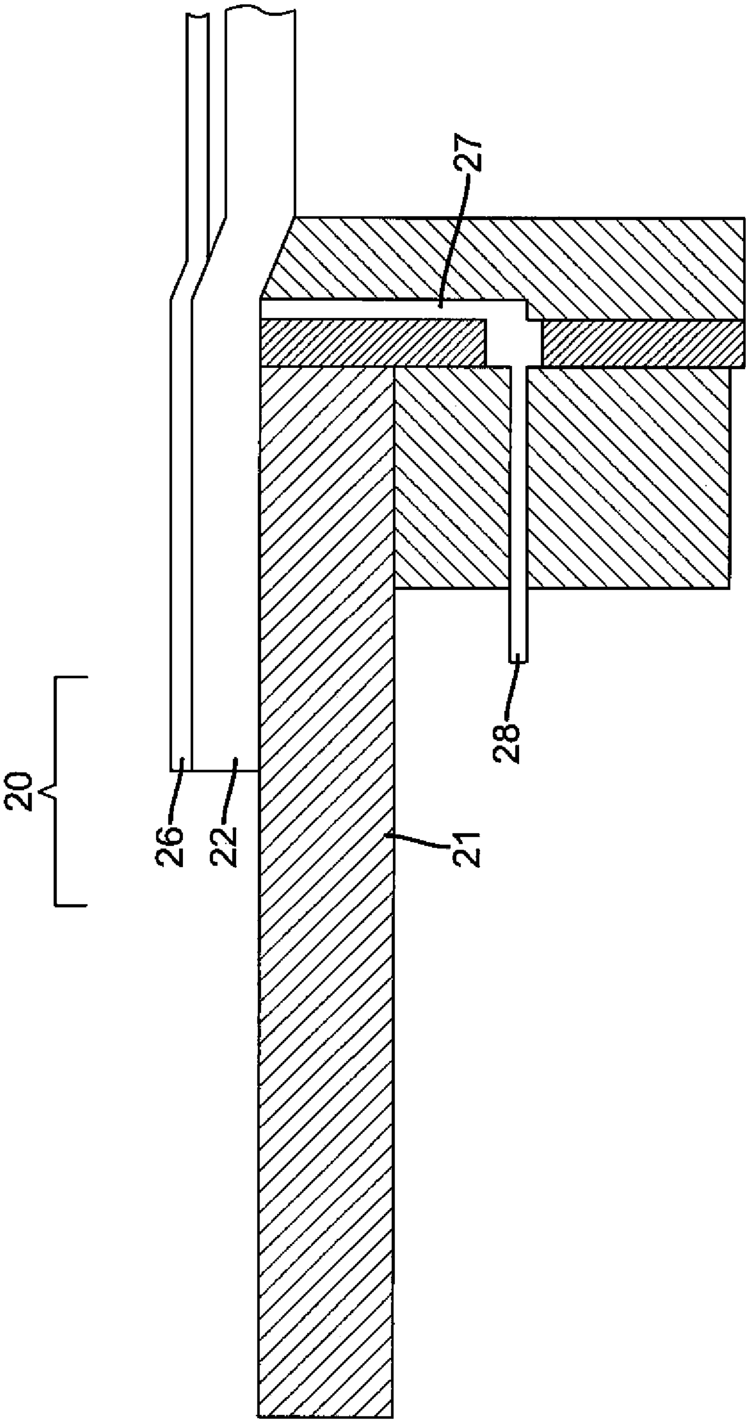
FIG. 1 is a schematic cross-sectional view, not to scale, of an outer compliant layer surrounding an inner compliant layer being mounted or removed simultaneously onto a sleeve mandrel.

For better understanding of the present invention, together with other advantages and capabilities thereof, reference is made to the following detailed description in connection with the above-described drawings.

DETAILED DESCRIPTION OF THE INVENTION

To achieve the aforementioned objects, according to one aspect of the invention, an ISM is cast without a permanent metal core, lowering the cost to manufacture said part. Separately, a thinner OSM is manufactured by casting a compliant layer over a seamed low-cost substrate, preferably plastic, enabling low cost manufacturing methods contained in the accompanying disclosure, Docket 91084, and incorporated here by reference. The dimension of the inner diameter of the ISM is selected so as to create an interference with the mandrel it will be mounted on. The freestanding dimension of the inner diameter of the OSM is selected such that the outer diameter of the ISM is larger when it is installed on the mandrel but smaller when freestanding prior to installation. To realize the final working configuration of the DSR a novel mounting method is utilized. The OSM is slid over the ISM without interference prior to installation on the mandrel and together the concentric sleeves are installed as a single entity (using the air assist described earlier). The non-adhesive attachment between each surface, making the sleeves substantially unmovable during the operation of the roller, is maintained by 1) interference between the OSM and the ISM, 2) the interference between the ISM and the core, 3) the friction between the OSM and the ISM surfaces, 4) the friction between the ISM and the core and, 5) the stiffness of sleeve members and the core. Simultaneous removal of the ISM and OSM components of the DSM is accomplished in a similar manner as a single sleeve. This method overcomes disadvantages of previously disclosed methods of either sliding the ISM over a mandrel followed by sliding the OSM over the ISM, or heating or cooling ISM, OSM or mandrel components to take advantage of dimensional changes, all of which require complex hardware and or lengthy process steps to mount each sleeve. The present invention can be installed and removed using the apparatus used for single-sleeve designs, thereby significantly lowering the complexity and cost of the implementation and allowing field replacement in existing customer machines.

The invention discloses a double-sleeved roller (DSR) for use in an electrostatographic machine, the DSR including a substantially cylindrical substantially rigid core member, a replaceable removable inner sleeve member (ISM) that may be single or multi-layer, in the shape of an endless tubular belt including at least one compliant layer such that the ISM surrounds and non-adhesively intimately contacts the core member, and a replaceable removable multi-layer outer sleeve member (OSM) in the shape of an endless tubular belt including at least one synthetic layer such that the OSM surrounds and non-adhesively intimately contacts the ISM. The synthetic layer may comprise, for example, a plastic, a polymer, a copolymer, an elastomer, a foam, a photoconductive material, a material including filler particles, a material including two or more phases, or a material reinforced with fibers or mesh. Prior to mounting on the rigid core member, the OSM is placeable around the ISM by slipping the OSM over the ISM in a concentric arrangement to form a double-sleeved member (DSM). The DSM is placeable on the core member by a sleeve placement method and the DSM is removable from the core member by a sleeve removal method. Each of the sleeve members retains the form of an endless belt during placement of the DSM or during removal of the DSM and during operation of the double-sleeved roller. The ISM and OSM sleeve members may include indicia. The details of the indicia for an ISM and OSM have previously been disclosed in U.S. Pat. No. 6,377,772 B1 and are hereby incorporated by reference. In the preferred embodiments, the DSR may be a double sleeve primary image-forming member (DSPIFM), a double-sleeved intermediate transfer member (DSITM), or a bifunctional photoconductive DSITM.

A preferred sleeve placement method includes: 1) assembling the ISM and OSM to form a DSM; 2) providing a source of a pressurized fluid to the inner surface of the ISM, the preferred pressurized fluid being compressed air; 3) turning on the source of the pressurized fluid to elastically expand the ISM member so as to contact the OSM and allow the ISM and OSM to simultaneously move along the surface of a core member; 4) continuing to keep open the source of pressurized fluid while sliding the DSM until it reaches a predetermined position surrounding the core member, and; 5) shutting off the source of the pressurized fluid, thereby allowing the DSM to relax and grip the said core member under tension. Other methods of DSM may be used, including manual force unassisted by a pressurized fluid, heating the sleeve member being placed on a substrate, or cooling the substrate in order to take temporary advantage of dimensional changes produced by the heating or cooling.

A preferred sleeve removal method includes: 1) providing a source of a pressurized fluid to the inner surface of a DSM, the preferred pressurized fluid being compressed air: 2) turning on the source of the pressurized fluid to elastically expand the DSM so as to allow the ISM and OSM to simultaneously move along the surface of a core member; 3) continuing to keep open the source of pressurized fluid while sliding the DSM and removing it from the core member; 4) allowing the ISM to retract away from the OSM (to allow for separation if desired), and; 5) shutting off the source of the pressurized fluid. Other methods of sleeve removal may be used, including manual force unassisted by a pressurized fluid, heating the sleeve member being removed from a substrate, or cooling the substrate in order to take temporary advantage of dimensional changes produced by the heating or cooling.

Figure 2:
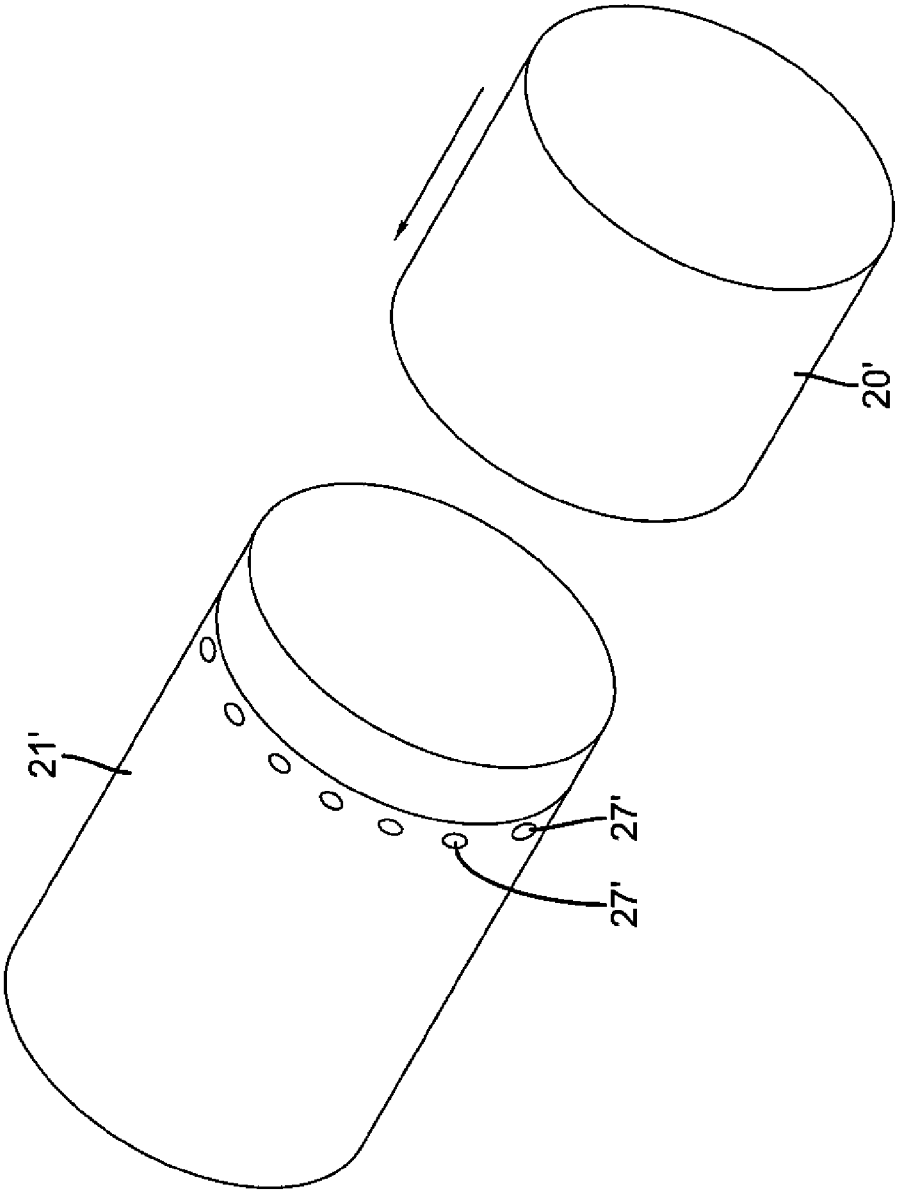
FIG. 2 is a schematic perspective view, not to scale, of the mounting of an inner and outer compliant layer onto a sleeve mandrel to form an imaging roller.

FIG. 1 shows a cross-sectional view of a preferred embodiment of a DSM identified by the numeral 20, which is mounted on a cylindrical rigid core member identified by the numeral 21. The DSM is comprised of the ISM identified by numeral 22 and the OSM identified by numeral 26. The core member 21 is substantially rigid and is generally not solid throughout, as shown in FIG. 1 and preferably includes a hollow cylindrical metal tube or shell made for example from aluminum. Core member 21 may have interior structures which may include chambers as identified by numeral 28, e.g., for compressed air and associated piping, strengthening struts, and the like, and may be provided with holes for carrying compressed air from an interior chamber through its cylindrical shell during placement or removal of the DSM. FIG. 2 shows a perspective view of the mounting of a DSM identified by numeral 21' on a core member identified by the numeral 27' that provide pressurized fluid to the inner surface of a DSM.

Figure 3A:
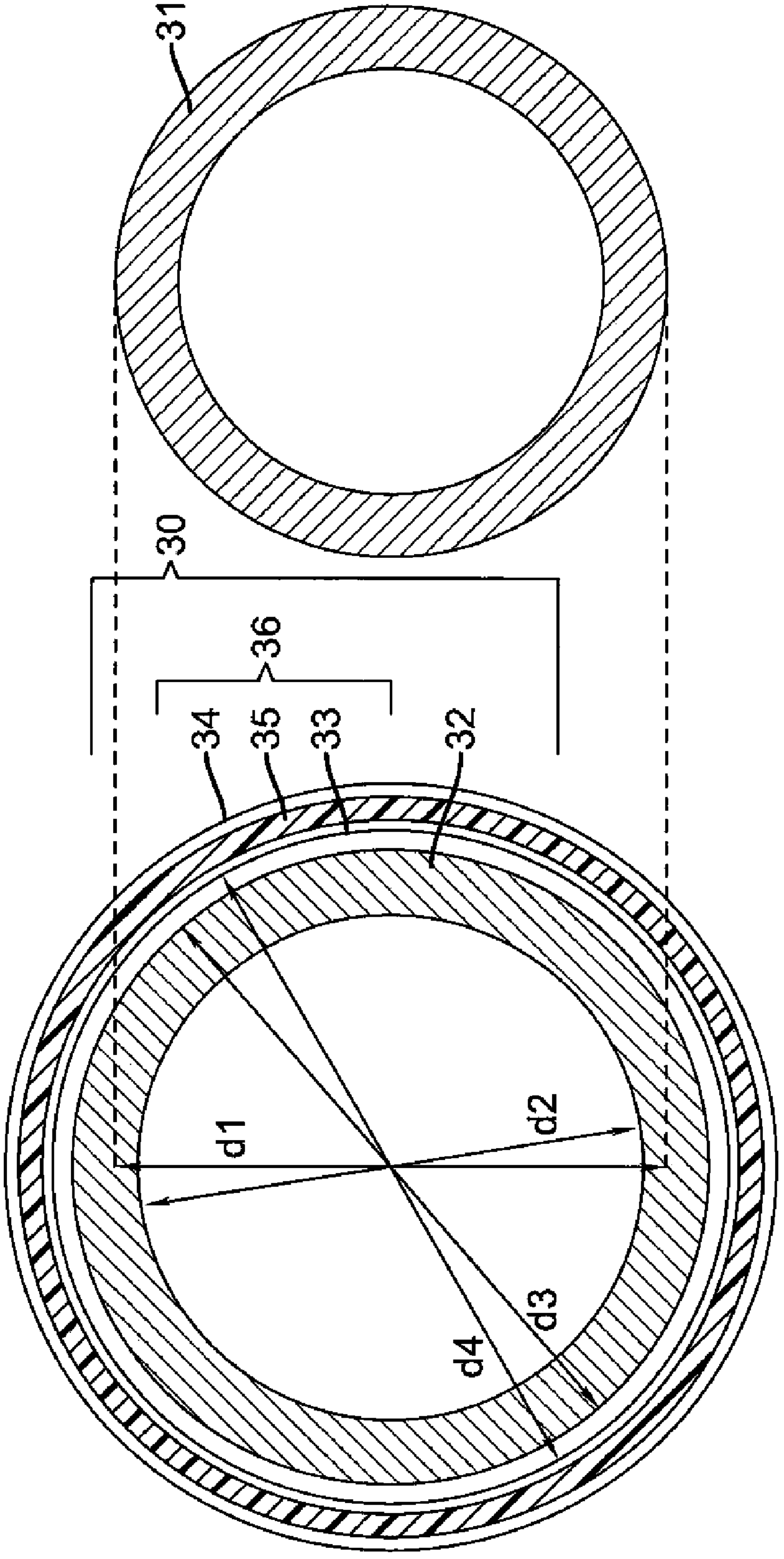
FIG. 3(*a*) is a cross-sectional view, not to scale, of a double-sleeved intermediate transfer member (DSITM) roller according to an embodiment of the invention.
Figure 3B:
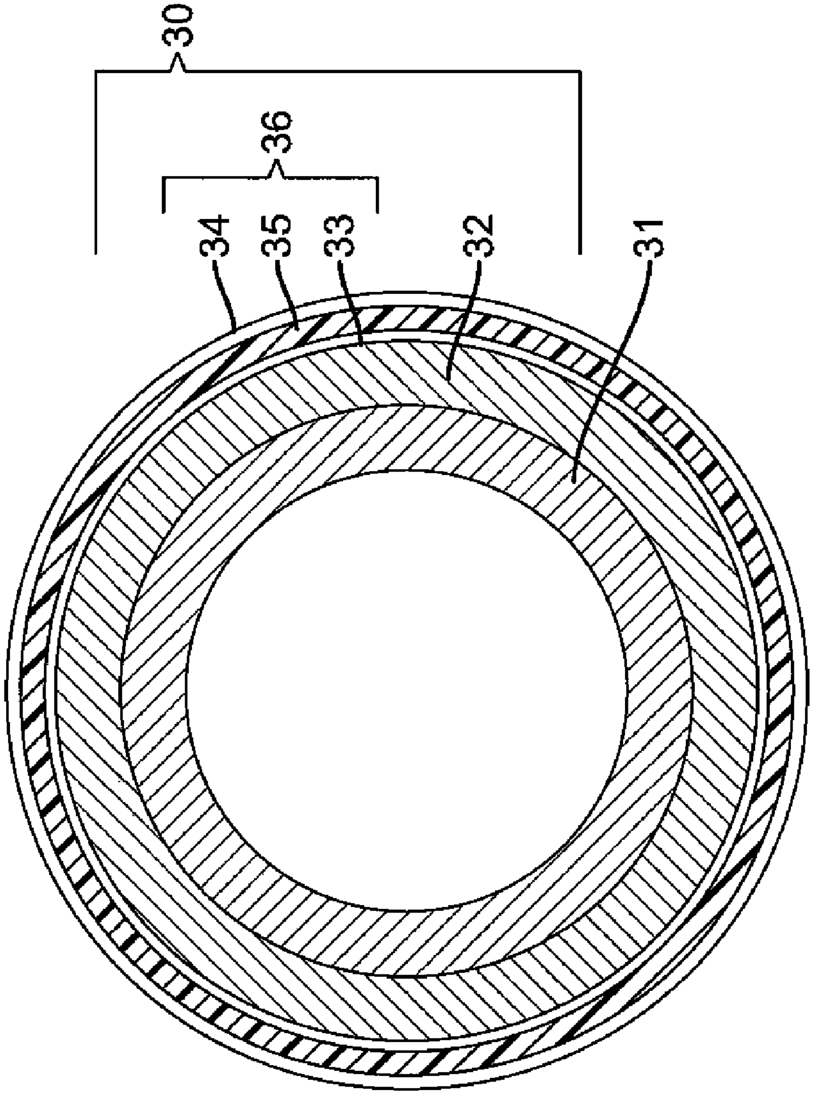

In FIG. 3(*a*) is shown a cross-sectional view of one preferred embodiment of a DSM, which is identified with a numeral 30 and which may be used as a DSITM. The ISM and OSM that constitute the DSM are identified respectively as numerals 32 and 36. The ISM is comprised of only an inner sleeve compliant layer (ISCL). The OSM is comprised of an outer sleeve stiffening layer (OSSL), an outer sleeve compliant layer (OSCL) and an outer sleeve release layer (OSRL).

A preferred embodiment of an OSM is identified by the numeral 36. The OSM 36 is an endless tubular belt and includes an OSSL 33, an OSCL 35 coated on the OSSL 33, and an OSRL 34 coated on the OSCL 35. The OSSL 33 is preferably an insulating plastic material such as, for example, polyester, polyethylene, polycarbonate, polyimide, polyamide or a fluoropolymer, the polymeric material having a yield strength that is not exceeded during use. It is envisioned for some applications that the OSSL is coated on one or both sides with a thin conductive layer such as vacuum deposited nickel or aluminum. Alternatively, the OSSL is a bulk conductor with an effective volume electrical resistivity that is preferably less than the resistivity of the OSCL, such as a plastic have a fine dispersion of carbon particles, ionically doped plastic, or a metal. The use, importance, and description of the electrical properties and biasing methods are contained in the accompanying disclosure, Docket. 92459, and are incorporated herein by reference. For example, in some applications it may be preferred to electrically bias the thin conductive layer while in other embodiments the electrical connection is connected to the core member 31. OSSL 33 may be a seamless or seamed endless belt. The OSSL 33 may also comprise a fabric or a reinforced material. OSSL 33 preferably has a thickness less than about 500 micrometers and more preferably in a range of 20-200 micrometers. The OSSL 33 also has a Young's modulus preferably greater than about 0.1 GPa and more preferably in a range 0.1-20 GPa. The modulus and thickness of the sleeve member layers both contribute to the hoop stiffness of each member. The hoop stiffness is characterized by the resistance of the member to expand diametrically such that greater hoop stiffness provides more resistance to diametric expansion. The hoop stiffness of the OSM is preferably greater than the stiffness of the ISM.

The OSCL 35 has a thickness in a range 0.05-2 mm, and preferably has a Young's modulus less than about 10 MPa and more preferably in a range 1-5 MPa. The OSCL 35 is preferably formed of a polymeric material, e.g., an elastomer such as a polyurethane or other materials well noted in the published literature, and may comprise a material having one or more phases, e.g., a foam or a dispersion of one solid phase in another. Preferably, the OSCL 35 has a Poisson's ratio in a range 0.2-0.5, and more preferably the OSCL has a Poisson's ratio in a range 0.45-0.5, and a preferred material is a polyurethane with a Poisson's ratio of about 0.495. In order to provide a suitable resistivity, the OSCL 35 may be doped with sufficient conductive material (such as antistatic particles, ionic or electronic conducting materials, or electrically conducting dopants) to have a moderate resistivity. The OSCL 35 should have a bulk electrical resistivity preferably in a range $10^7$-$10^{11}$ ohm-cm, and more preferably about $10^9$ ohm-cm. While the preferred OSM has been described with an outer sleeve compliant layer (OSCL) an OSM without an OSCL is also envisioned, for example in applications requiring a very low cost replaceable surface component.

The OSRL 34 preferably includes a synthetic material such as a sol-gel, a ceramer, a polyurethane or a fluoropolymer, but other materials having good release properties including low surface energy materials may also be used. The OSRL 34 preferably has a Young's modulus greater than 100 MPa, more preferably 0.5-20 GPa, and a thickness preferably in a range of 1-50 micrometers and more preferably in a range 4-15 micrometers. The OSRL 34 has a bulk electrical resistivity preferably in a range $10^7$-$10^{13}$ ohm-cm and more preferably about $10^{10}$ ohm-cm.

The preferred embodiment of an ISM is identified by the number 32. The ISM 32 is preferably an endless tubular belt and comprises an ISCL. The ISCL preferably has a thickness in a range 3-20 mm and more preferably 5-10 mm, and preferably has a Young's modulus less than about 10 MPa and more preferably in a range 1-5 MPa. The ISCL is preferably formed of a polymeric material, e.g., an elastomer such as silicone, polyurethane or other materials well noted in the published literature, and may comprise a material having one or more phases, e.g., a foam or a dispersion of one solid phase in another. Preferably, the ISCL has a Poisson's ratio in a range 0.2-0.5, and more preferably the ISCL has a Poisson's ratio in a range 0.45-0.5, and a preferred material is polyurethane with a Poisson's ratio of about 0.495. In order to provide a suitable resistivity, the elastomer including the ISCL may be doped with sufficient conductive material (such as antistatic particles, ionic or electronic conducting materials, or electrically conducting dopants) to have a low to moderate resistivity. The ISCL should have a bulk electrical resistivity in a range of $10^0$-$10^{11}$ ohm-cm, more preferably in a range of $10^7$-$10^{11}$ ohm-cm, and most preferably about $10^9$ ohm-cm. To improve mounting of the DSM onto the core member it may be advantageous to include an inner sleeve support layer (ISSL) (not shown) by coating the inner ISM surface or manufacturing the ISM with a support substrate to enable greater control of the friction and holding force between the core and the ISM. Suitable properties of support substrates for the ISSL have been described previously for the OSSL. Suitable coatings for the ISM inner surface envisioned here are widely available. To improve the slip fit of the OSM onto the ISM member prior to installation it may be advantageous to include an inner sleeve exterior layer (ISEL) (not shown) by coating the outer ISM surface to enable greater control of the friction between the OSM and the ISM. Such coatings are envisioned here and are widely available.

In FIG. 3(*a*) is shown a cross-sectional view of a preferred DSR embodiment prior to installation on the core member 31. The ISM 32 has a freestanding (unexpanded) inner diameter d2 that is smaller than the outside diameter d1 of the rigid core 31 by 0.250-8.0 mm and more preferably in the range 0.500-4 mm. The OSM 36 has a freestanding (unexpanded) inner diameter d4 that is larger that the outside diameter d3 of the ISM 32 by 0.100-8 mm and more preferably in the range of 0.5-4 mm. FIG. 3(*b*) shows a cross-sectional view of a preferred DSR embodiment following installation on the core member 31 with the ISM in non-adhesive contact with the core and the OSM in non-adhesive contact with the ISM.

Figure 4A:
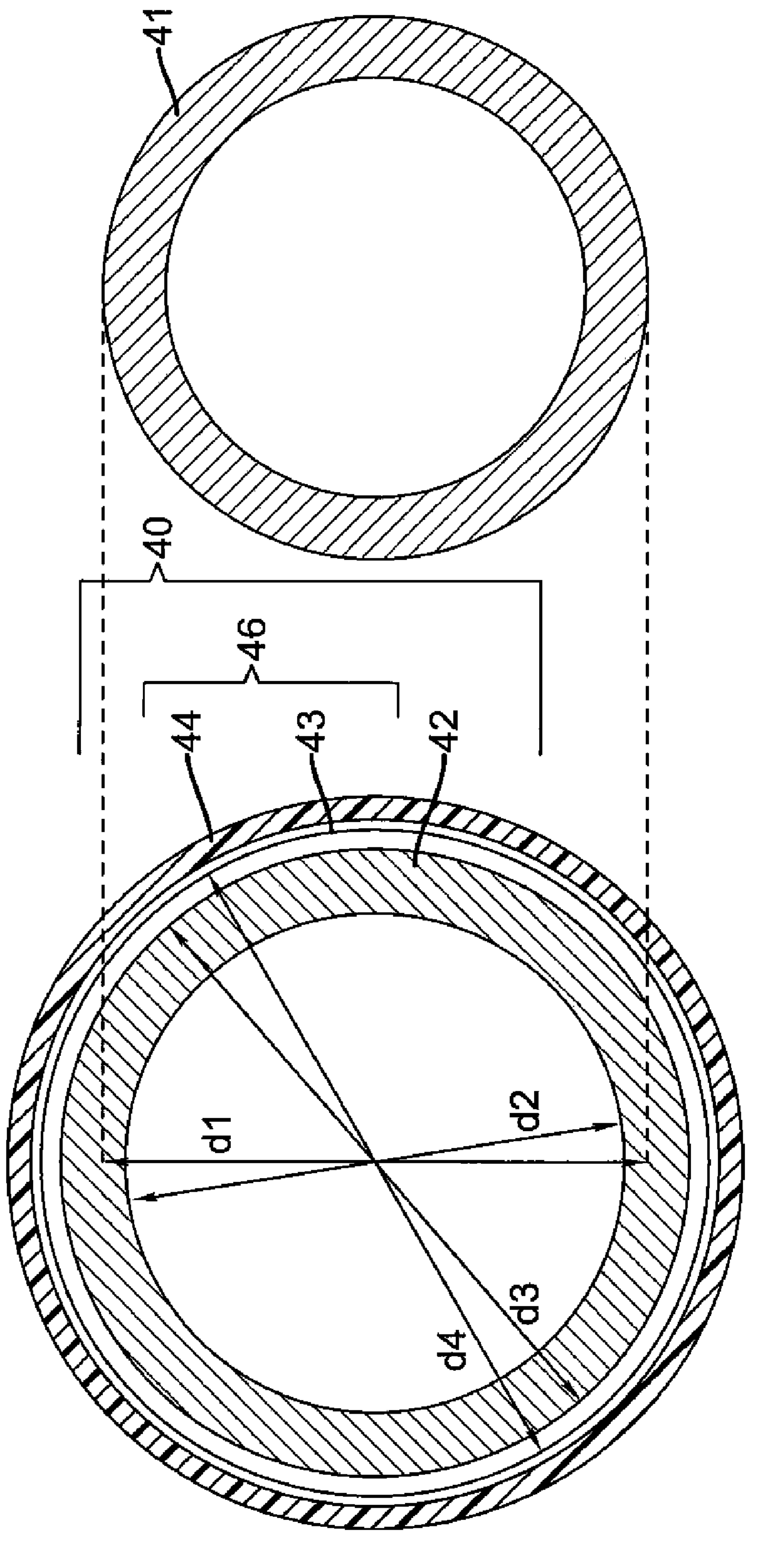
FIG. 4(*a*) is a cross-sectional view, not to scale, of a double-sleeved primary image-forming member (DSPIFM) according to an embodiment of the invention.
Figure 4B:
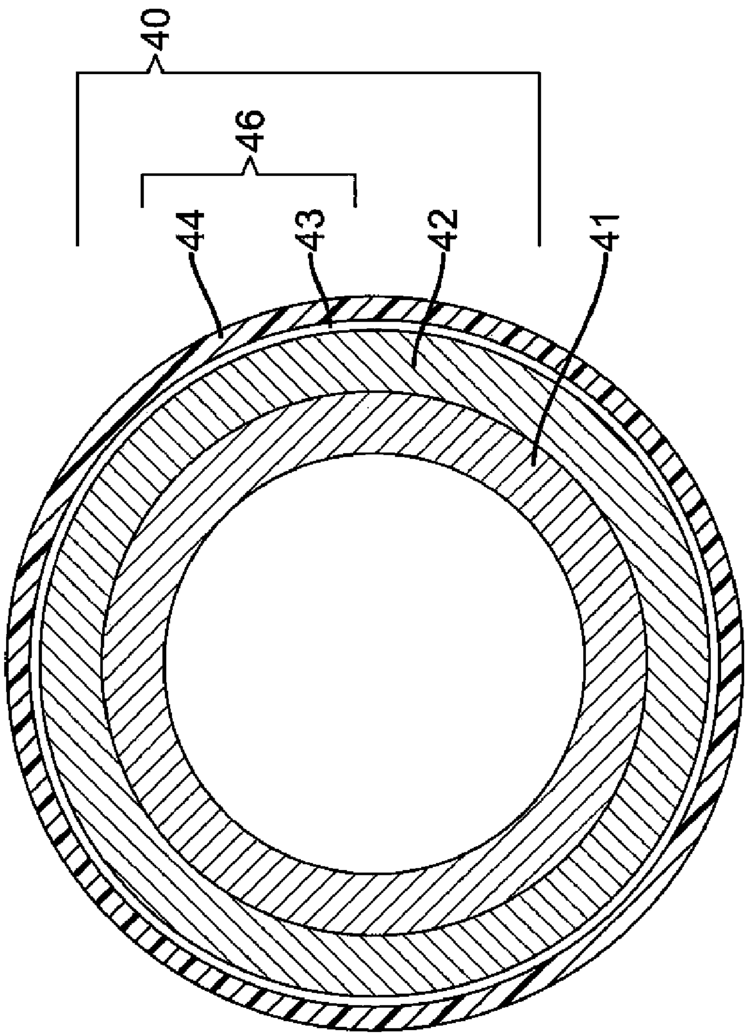

In FIG. 4(*a*) is shown a cross-sectional view of another preferred embodiment of a DSM, that is identified with numeral 40 and which may be used as a DSPIFM. The ISM and OSM that constitute the DSM are identified respectively as numerals 42 and 46. The ISM is comprised of only an inner sleeve compliant layer (ISCL). The OSM is comprised of an outer sleeve member stiffening layer (OSSL) 43 and a photoconductive structure 44 coated on the OSSL. The OSSL 43 is for all extents and purposes the same as DSITM OSSL 33, shown in FIG. 3 (*a*), and is not described further here. The photoconductive structure 44 may include one or more layers which may comprise any known suitable photoconductive materials. The details of suitable photoconductive materials and layer structure have previously been disclosed in U.S. Pat. Nos. 5,732,311: 5,828,931 and 6,377,772 B1 and are herby incorporated by reference. The ISM 42 is for all extents and purposes the same as ISM 32, and is not described further here. The DSPIFM may be mounted and removed from the cylindrical rigid core member identified by the numeral 41 in the same manner previously described for the DSITM. In FIG. 4(*b*) is shown a cross-sectional view of a preferred DSR embodiment following installation on the core member 41 with the ISM in intimate contact with the core and the OSM in intimate contact with the ISM.

EXAMPLE

Preparation of a Double-Sleeved Intermediate Transfer Member

Figure 5A:
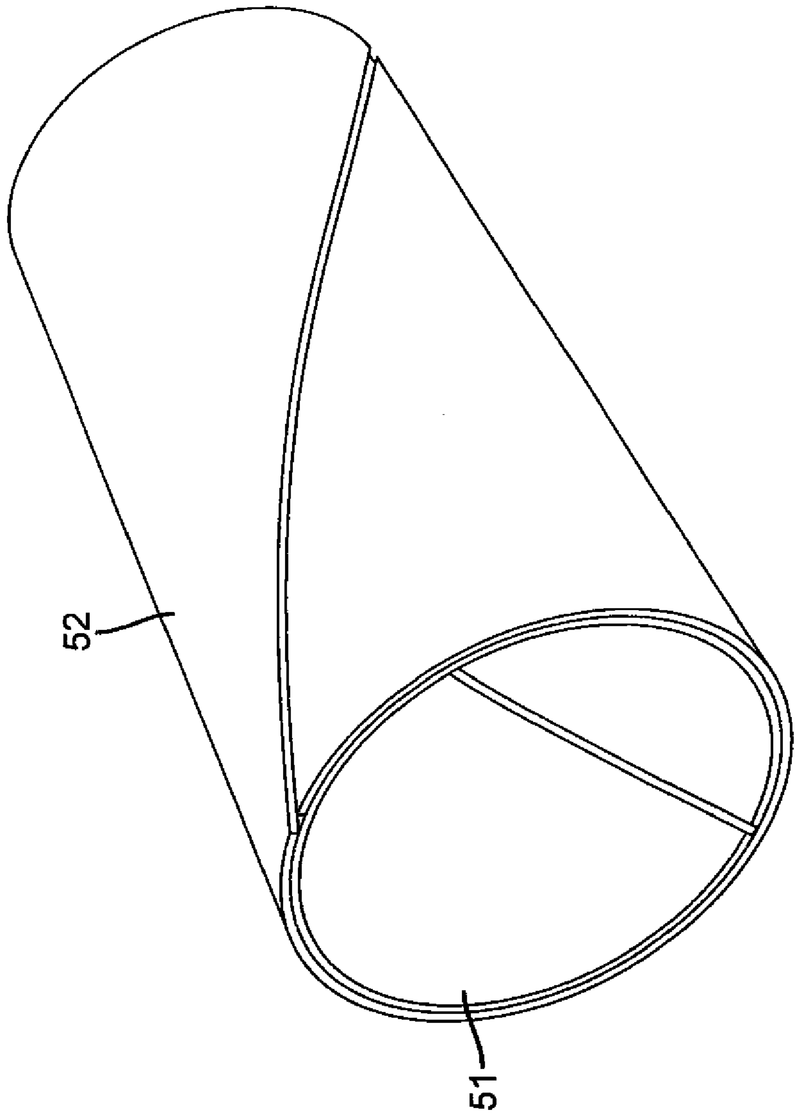
FIG. 5(*a*) is a schematic perspective view, not to scale, of a DSITM outer sleeve support (OSSL) according to an embodiment of the invention.
Figure 5B:
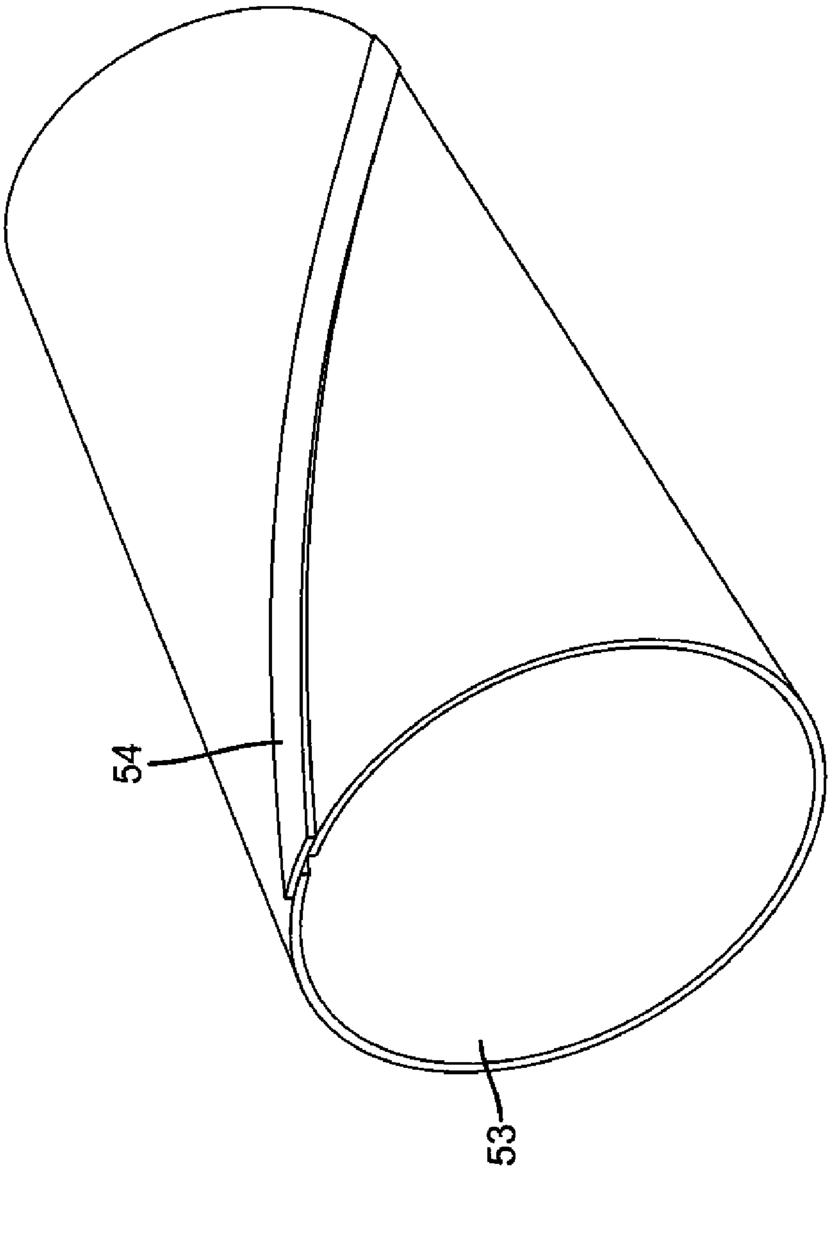

An outer sleeve member (OSM) was made as described below, with reference to OSM 30 in FIG. 3(*a*). An outer sleeve support layer (OSSL) 33 was assembled from two polyester films of about 0.125 mm thickness with nickel disposed on one surface and an adhesive disposed on the opposite surface of each film. The resulting OSSL is shown if FIG. 5 (*a*). The first layer polyester film identified by numeral 51 was wrapped on an aluminum fabrication mandrel, with an outside diameter of about 172.000 mm (d4), so that the nickel coated surface was in intimate contact with the aluminum mandrel and the ends of the film were brought together to form a butt seam. The seam of the first layer polyester film formed an angle of about 30 degrees when measured from a line drawn on the film parallel to the axis of the cylinder. The second layer polyester film identified by numeral 52 was wrapped on the first polyester film so that the adhesives of each film were brought in contact with one another and the ends of the film were brought together to form a second butt seam. The seam of the second layer polyester film was established about 180 degrees from the original seam when measured about the axis of the mandrel cylinder and formed an angle of about 30 degrees when measured from a line drawn on the film parallel to the axis of the mandrel cylinder. A schematic of an alternate OSSL including a single layer film, identified by numeral 53, with a taped butt seam is shown in FIG. 5 (*b*). An outer sleeve compliant layer (OSCL) 35 of polyurethane was cast onto the OSSL, ground to a thickness of about 1.1 mm and ring-coated with about a 6 micrometer thick layer of ceramer to form an outer sleeve release layer (OSRL) 34. An area of roughly 5 $cm^2$ was left uncoated on either side of the OSSL, leaving the nickel surface exposed on both sides. A piece of copper tape having a conductive adhesive was used to electrically connect both conductive surfaces of the OSSL, thus effectively removing the insulating polyester film from the effective impedance of the DSITM. The OSM with an inner diameter of 172.000 mm (d4) was then removed from the fabrication mandrel. An inner sleeve member (ISM) was made as described below with reference to ISM 32 in FIG. 3(*a*). Polyurethane was cast onto a cylindrical nickel core member in a mold, cured and ground so that the final outer diameter was 172.500 mm when mounted on a 154.000 mm device mandrel 31 resident in an electrophotographic machine (a Kodak NexPress 2100). When the ISM was removed from the device mandrel the outside diameter relaxed to a dimension of about 170.3 mm (d3) such that the OSM of about 172.000 mm (d4) inner diameter was slipped over the ISM without interference to form a double-sleeved member (DSM). To mount the DSM device mandrel in the electrophotographic machine a source of a pressurized air delivered by the mandrel was applied to the inner surface of the DSM to elastically expand the ISM member from its initial inner diameter size of about 151.800 mm (d2) to a dimension slightly larger than the mandrel dimension of about 154.000 mm (d1). At the same time the ISM outside dimension of about 170.300 mm (d3) is expanded to about 172.500 mm with the same applied pressurized air creating an interference with the OSM inner diameter of about 172.00 mm (d4). The expansion and subsequent contact between the ISM and OSM that formed the DSM allowed the ISM and OSM to simultaneously move along the surface of a core member until it reached a predetermined position surrounding the core member. Shutting off the source of the pressurized air allowed the DSM to relax and grip the said core member under tension. The roller was subsequently tested as an intermediate transfer member in an electrophotographic machine and was found to make images on the receiver sheets. The DSM was then removed with pressurized air in a similar way to that described for installation with the ISM and OSM simultaneously moving along the surface of a core member until completely removed from the device mandrel. Once removed from the machine the ISM and OSM were separated into two pieces.

The invention has been described with reference to a particular preferred embodiment. It will be apparent, however, that certain modifications can be made without departing from the spirit of the invention.

It is claimed:

1. A double-sleeved roller for use in an electrostatographic machine, comprising:

a cylindrical rigid core member having an outer diameter;

a removable inner sleeve member (ISM) including a compliant layer, the ISM having freestanding (unexpanded) inner and outer diameters, where the freestanding (unexpanded) inner diameter is smaller than the outer diameter of the rigid core, and the ISM being expanded such that the ISM surrounds and intimately contacts said rigid core member; and a removable electrically conductive outer sleeve member (OSM), such that the OSM surrounds and intimately contacts said expanded ISM, wherein the OSM has a freestanding (unexpanded) inner diameter that is larger than the freestanding (unexpanded) outer diameter of the ISM and the OSM has a hoop stiffness that is greater than a hoop stiffness of the ISM, such that the OSM may be slid over the ISM without interference before the ISM is expanded and the ISM and OSM are removable or mountable simultaneously when the ISM is expanded.

2. The double-sleeved roller according to claim 1 wherein said outer sleeve member further comprises an outer sleeve stiffening layer.

3. The double-sleeved roller according to claim 2, wherein the outer sleeve stiffening layer is selected from the group consisting of polyesters, polyethylenes, polycarbonates, polyimides, polyamides, fiber reinforced material, nickel, aluminum, stainless steel and fluoropolymers.

4. The double-sleeved roller according to claim 2, wherein the outer sleeve stiffening layer is electrically conductive.

5. The double-sleeved roller according to claim 2, wherein the outer sleeve stiffening layer has a thickness less than 500 micrometers.

6. The double-sleeved roller according to claim 2, wherein the outer sleeve stiffening layer has a Young's modulus greater than 100 MPa.

7. The double-sleeved roller according to claim 1, wherein said outer sleeve layer further comprises an outer sleeve compliant layer.

8. The double-sleeved roller according to claim 7, wherein the outer sleeve compliant layer has a thickness of from 0.05 to 2 mm.

9. The double-sleeved roller according to claim 7, wherein the outer sleeve compliant layer has a Young's modulus of less than 10 MPa.

10. The double-sleeved roller according to claim 7, wherein the outer sleeve compliant layer comprises an elastomer.

11. The double-sleeved roller according to claim 7, wherein the outer sleeve compliant layer has a bulk electrical resistivity of from $10^7$ to $10^{11}$ ohm-cm.

12. The double-sleeved roller according to claim 1, wherein said outer sleeve layer further comprises an outer release layer.

13. The double-sleeved roller according to claim 12, wherein the outer sleeve release layer is selected from the group consisting of a sol-gels, ceramers, polyurethanes and fluoropolymers.

14. The double-sleeved roller according to claim 12, wherein the outer sleeve release layer has a Young's modulus greater than 100 Mpa.

15. The double-sleeved roller according to claim 12, wherein the outer sleeve release layer has a thickness of from of 1 to 50 micrometers.

16. The double-sleeved roller according to claim 12, wherein the outer sleeve release layer has a bulk electrical resistivity of from $10^7$ to $10^{13}$ ohm-cm.

17. The double-sleeved roller according to claim 1, wherein the inner sleeve member has a Young's modulus less than 10 MPa.

18. The double-sleeved roller according to claim 1, wherein the inner sleeve member has a thickness of from 3 to 20 mm.

19. The double-sleeved roller according to claim 1, wherein the inner sleeve member comprises a polymeric material.

20. The double-sleeved roller according to claim 1, wherein the inner sleeve member has a Poisson's ratio of from 0.2 to 0.5.

21. The double-sleeved roller according to claim 1, wherein the inner sleeve member further comprises an inner sleeve support layer.

22. The double-sleeved roller according to claim 1, wherein the inner sleeve member further comprises an inner sleeve exterior layer.

23. The double-sleeved roller according to claim 1 wherein the OSM has a freestanding (unexpanded) inner diameter that is from 0.100 mm-8 mm larger than the freestanding (unexpanded) outer diameter of the ISM.

24. A double-sleeved roller for use in an electrostatographic machine, comprising:

a cylindrical rigid core member having an outer diameter;

a removable inner sleeve member (ISM) including a compliant layer, the ISM having freestanding (unexpanded) inner and outer diameters, where the freestanding (unexpanded) inner diameter is smaller than the outer diameter of the rigid core, and the ISM being expanded such that the ISM surrounds and intimately contacts said rigid core member; and a removable outer sleeve member (OSM) including an outer sleeve layer comprising an outer sleeve photoconductive layer, such that the OSM surrounds and intimately contacts said expanded ISM, wherein the OSM has a freestanding (unexpanded) inner diameter that is larger than the freestanding (unexpanded) outer diameter of the ISM and the OSM has a hoop stiffness that is greater than a hoop stiffness of the ISM, such that the OSM may be slid over the ISM without interference before the ISM is expanded and the ISM and OSM are removable or mountable simultaneously when the ISM is expanded.

25. A double-sleeved roller for use in an electrostatographic machine, comprising:

a cylindrical rigid core member having an outer diameter;

a removable inner sleeve member (ISM) including a compliant layer, the ISM having freestanding (unexpanded) inner and outer diameters, where the freestanding (unexpanded) inner diameter is smaller than the outer diameter of the rigid core, and the ISM being expanded such that the ISM surrounds and intimately contacts said rigid core member; and a removable electrically conductive outer sleeve member (OSM) including an outer sleeve layer comprising an outer sleeve stiffening layer and outer sleeve release layer, such that the OSM surrounds and intimately contacts said expanded ISM, wherein the OSM has a freestanding (unexpanded) inner diameter that is larger than the freestanding (unexpanded) outer diameter of the ISM and the OSM has a hoop stiffness that is greater than a hoop stiffness of the ISM, such that the OSM may be slid over the ISM without interference before the ISM is expanded and the ISM and OSM are removable or mountable simultaneously when the ISM is expanded.

26. The double-sleeved roller according to claim 25, wherein said outer sleeve layer further comprises an outer sleeve compliant layer interposed between said outer sleeve stiffening layer and said outer sleeve release layer.

27. The double-sleeved roller according to claim 25, wherein said outer sleeve comprises a photoconductive layer.

28. A method of mounting an outer sleeve member comprising:

providing a rigid cylindrical core member having an outer diameter;

providing a replaceable removable inner sleeve member (ISM), the ISM having freestanding (unexpanded) inner and outer diameters. where the freestanding (unexpanded) inner diameter is smaller than the outer diameter of the rigid core;

providing a replaceable removable electrically conductive outer sleeve member (OSM) comprising a seamed polymeric layer, a compliant layer and a release layer, the OSM having a freestanding (unexpanded) inner diameter that is larger than the freestanding (unexpanded) outer diameter of the ISM. and the OSM having a hoop stiffness that is greater than a hoop stiffness of the ISM;

mounting the replaceable outer sleeve member on said replaceable removable inner sleeve member by sliding the OSM over the ISM without interference to form a dual sleeve; and mounting the dual sleeve on said rigid cylindrical core by expanding the ISM such that the expanded ISM surrounds and intimately contacts said rigid core member and the OSM surrounds and intimately contacts said expanded ISM.

* * * * *

UNITED STATES PATENT AND TRADEMARK OFFICE

CERTIFICATE OF CORRECTION

PATENT NO. : 7,892,160 B2
APPLICATION NO. : 11/503778
DATED : February 22, 2011
INVENTOR(S) : Kittleson et al.

It is certified that error appears in the above-identified patent and that said Letters Patent is hereby corrected as shown below:

Column 9, line 48, Claim 14 delete "Mpa" and insert -- MPa --.

Column 9, line 51, Claim 15 before "1 to 50" delete "of".

Column 11, line 1, Claim 28 delete "diameters." and insert -- diameters, --.

Column 11, line 9, Claim 28 delete "ISM." and insert -- ISM, --.

Signed and Sealed this
Eighteenth Day of December, 2012

David J. Kappos
*Director of the United States Patent and Trademark Office*